June 1, 1937. R. McC. JOHNSTONE 2,082,634
ELECTRIC CONTROL SYSTEM
Filed Feb. 1, 1936 7 Sheets-Sheet 6
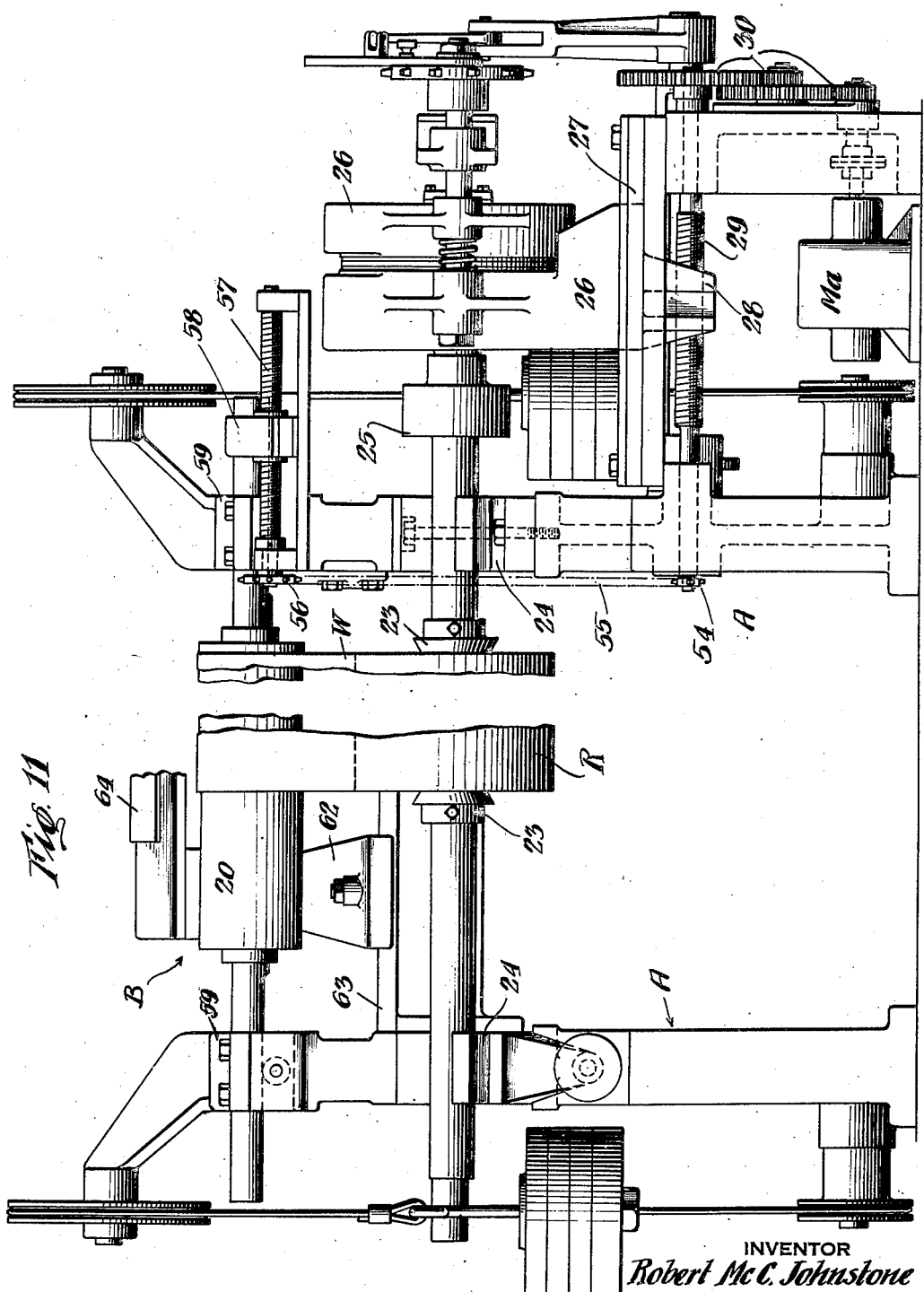
INVENTOR
Robert McC. Johnstone
BY
ATTORNEY

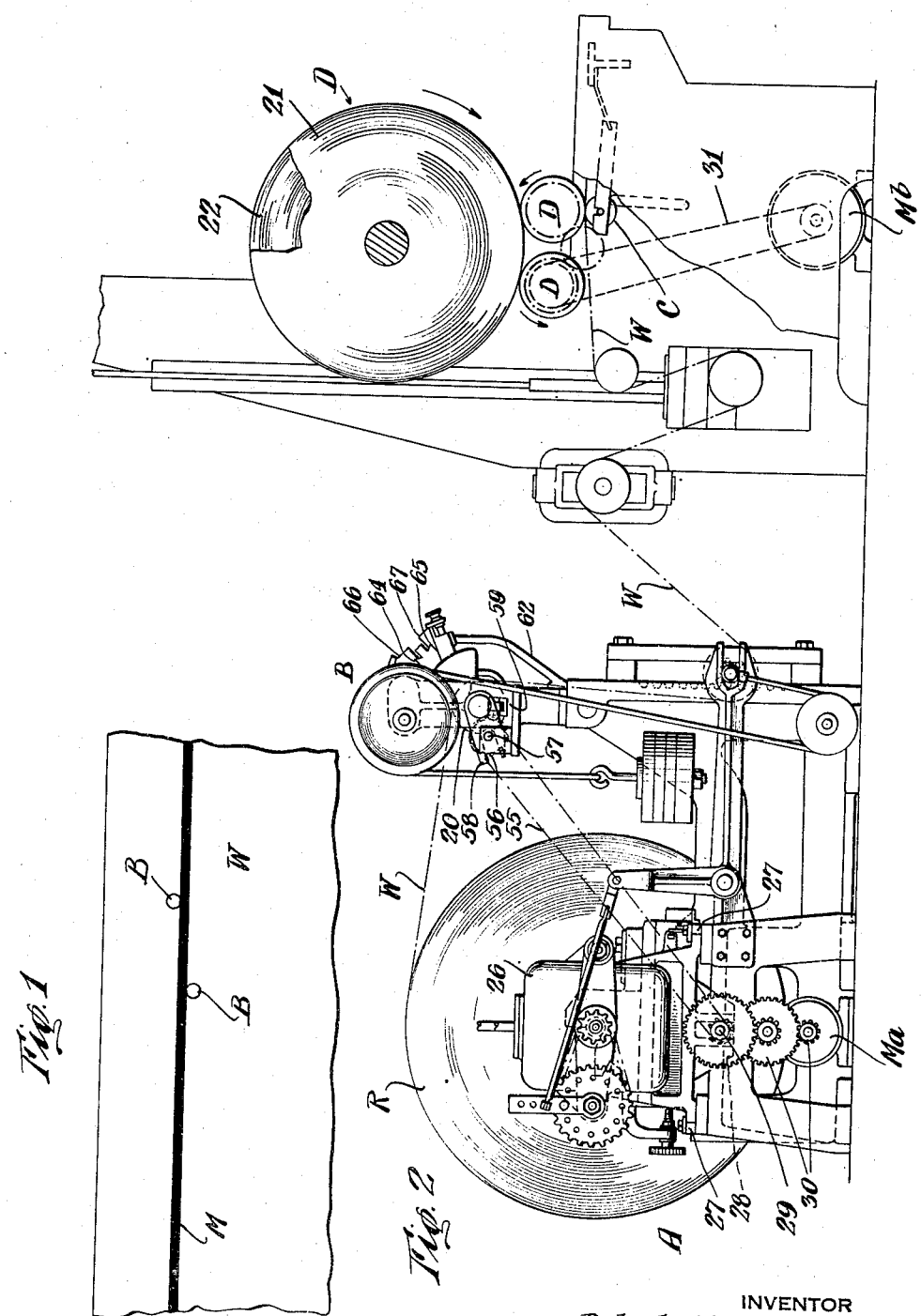

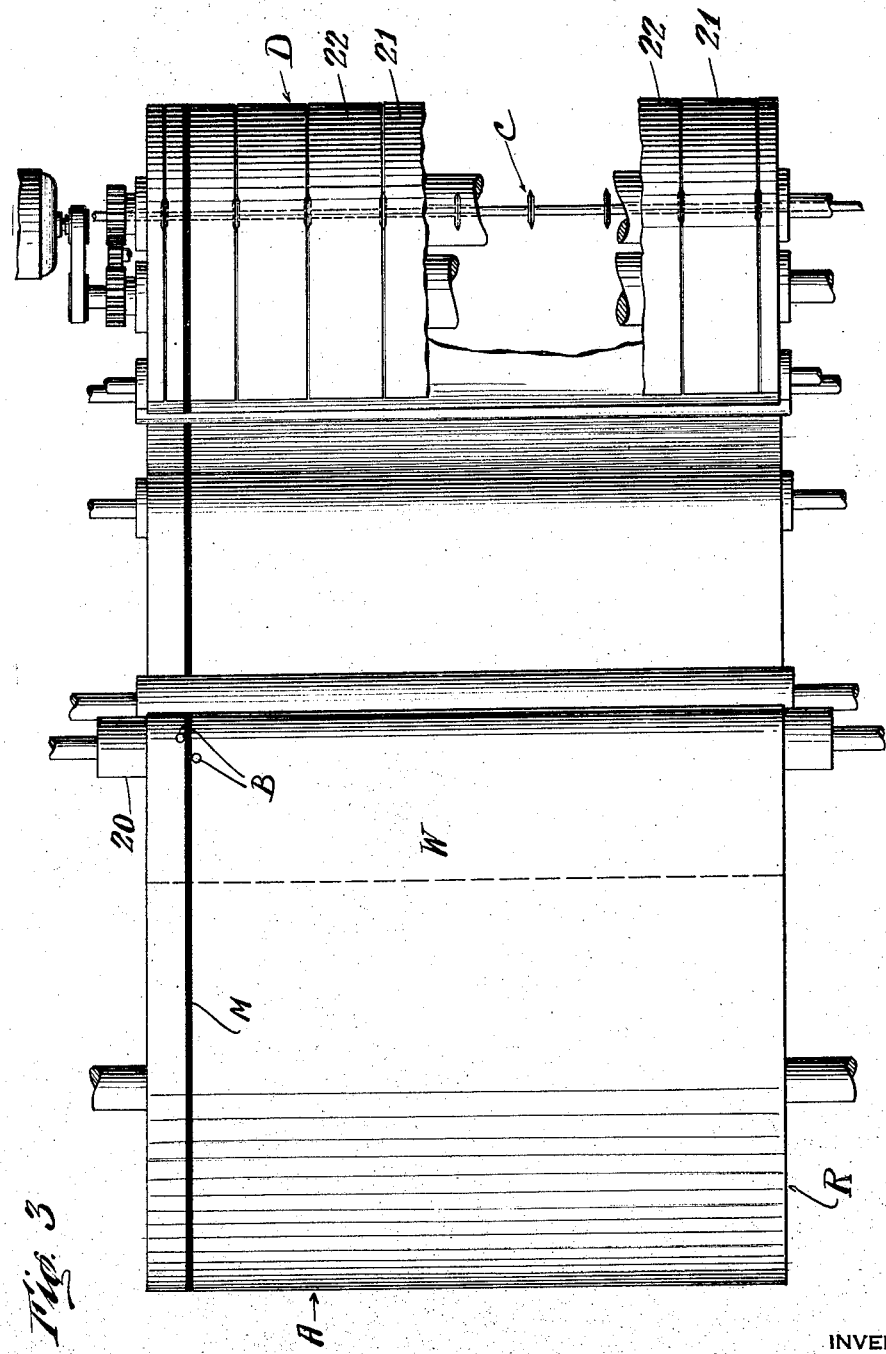

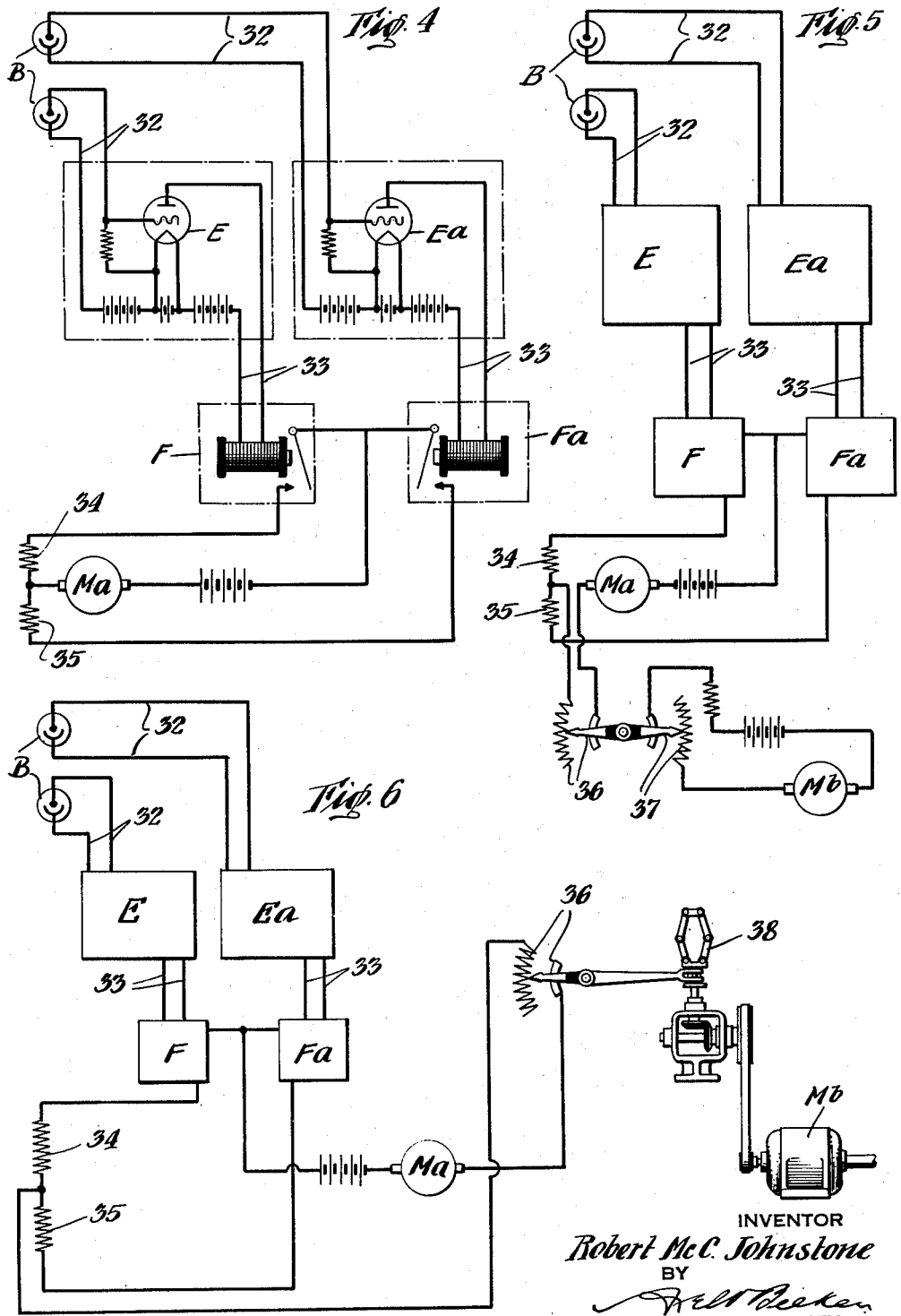

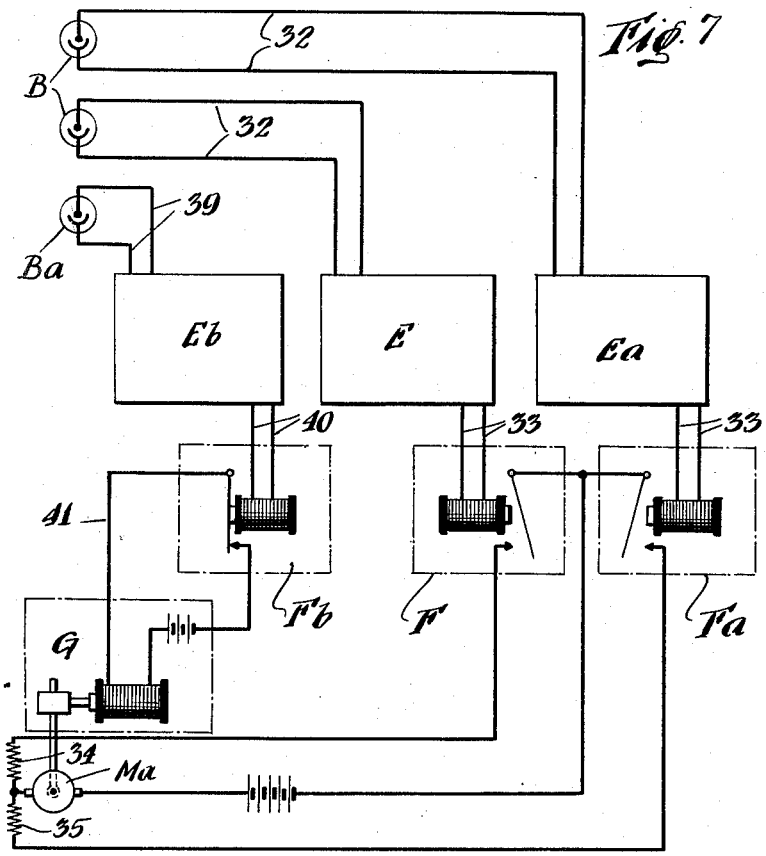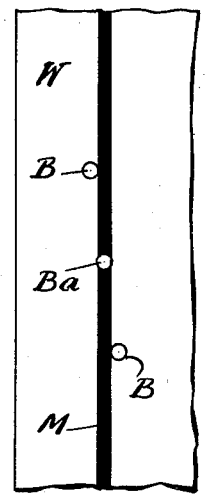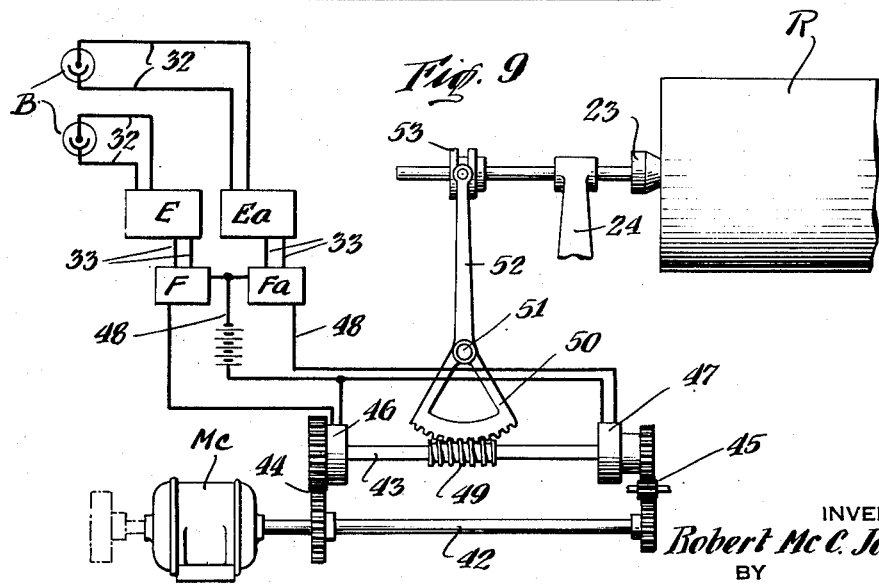

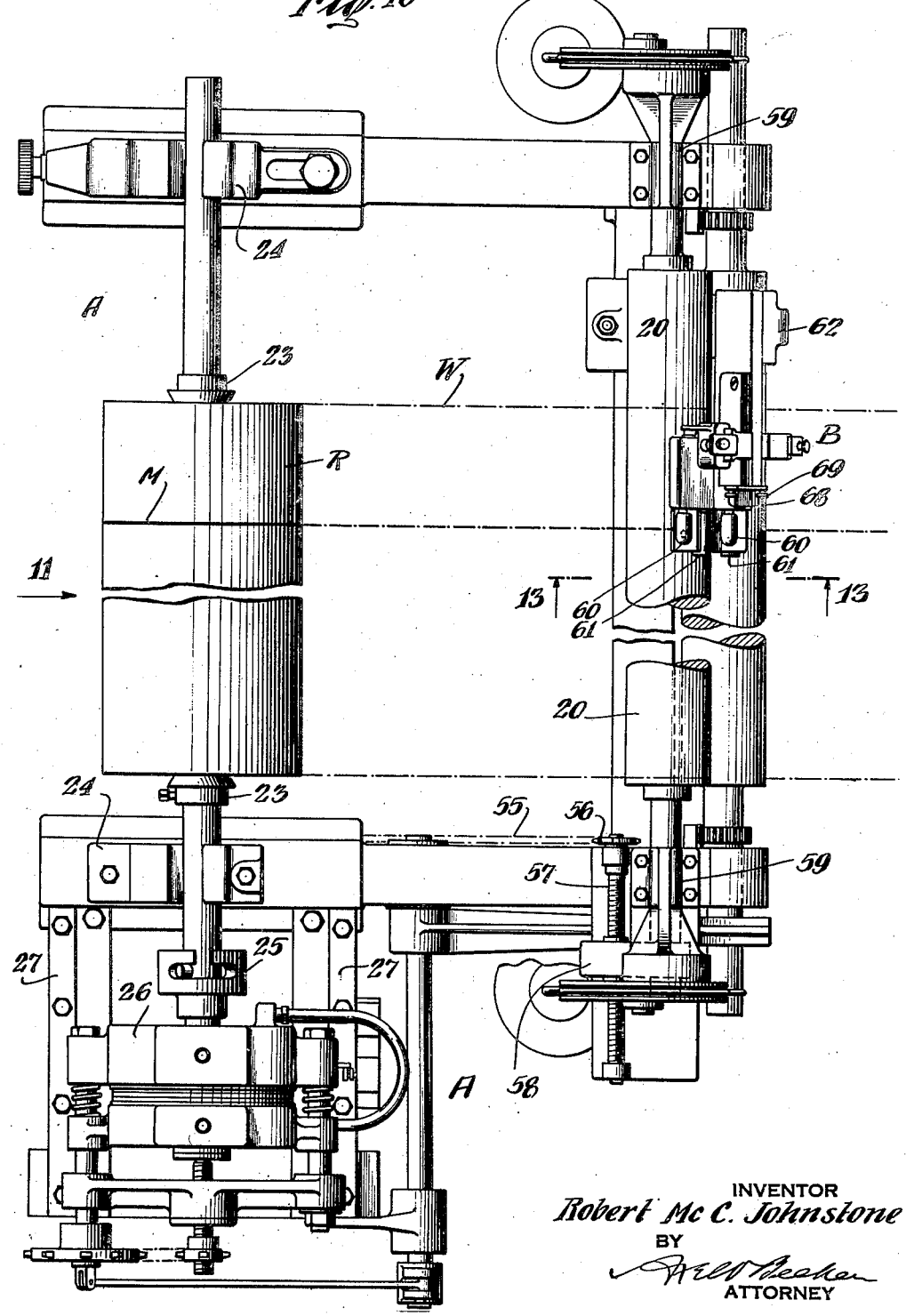

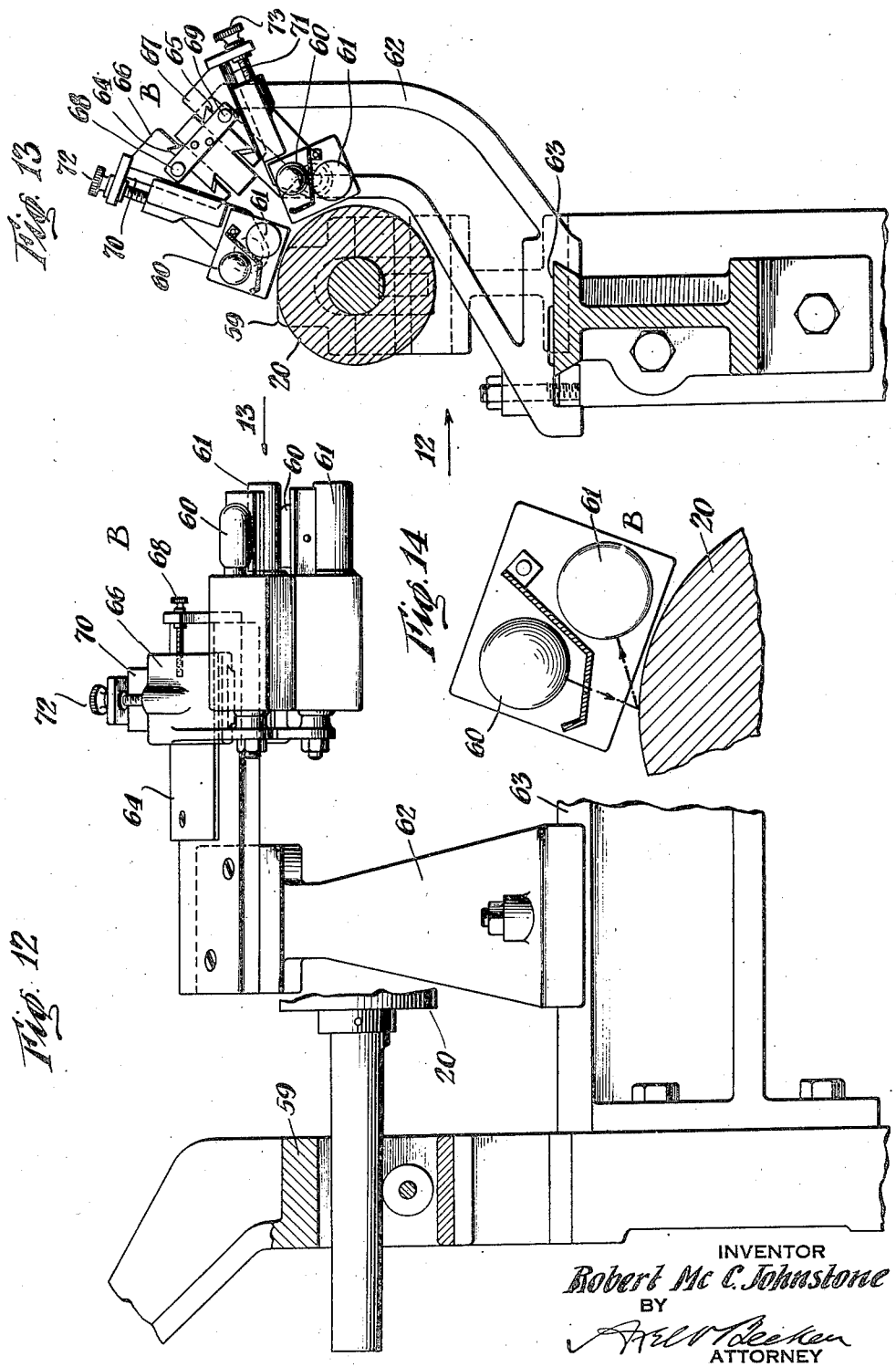

Patented June 1, 1937

2,082,634

UNITED STATES PATENT OFFICE 2,082,634

ELECTRIC CONTROL SYSTEM

Robert McC. Johnstone, Short Hills, N. J., assignor to Cameron Machine Company, Brooklyn, N. Y., a corporation of New York Application February 1, 1936, Serial No. 61,887

11 Claims. (Cl. 164—65)

This invention relates generally to electrical control systems, and has more particularly reference to a system for controlling the flow of a web of flexible material.

The main object and feature of the invention is to accurately control the side register of a web flowing at a relatively high speed from a web supply means, such as paper making machine or a rotatable reel from which the web is unwound, to a processing mechanism, such as a slitting mechanism, a winding mechanism or a printing machine. In the form of the invention here shown the processing mechanism is a slitting and winding machine.

Other objects and features of invention will appear as the specification proceeds.

In the accompanying drawings the invention is disclosed in several forms, in which Fig. 1 is a fragmentary plan view of a web section showing a longitudinal marking and with scanners arranged to scan opposite side edges of the marking;

Fig. 2 is a view in side elevation, with parts broken away of a roll supporting means or reel together with a slitting and winding machine;

Fig. 3 is a diagrammatic plan view of the parts shown in Fig. 2;

Fig. 4 is a wiring diagram showing one method of controlling the reversible motor for the reel shift mechanism from the scanners.

Fig. 5 is a view similar to Fig. 4 showing an interrelated speed control system between the winding machine motor and the reel shift motor;

Fig. 6 is a view similar to Fig. 5 showing a modified speed control system;

Fig. 7 is a view similar to Fig. 4 but shows the use of three scanners, one of which controls a brake;

Fig. 8 is a view similar to Fig. 1 but shows the location of the three scanners of Fig. 7 with respect to the marking on the web;

Fig. 9 is a view similar to Figs. 5 and 6 but shows a system wherein a single motor drives both the winding machine and the reel shift mechanism;

Fig. 10 is a top plan view of the parts at the left-hand side of Fig. 2, with parts broken away;

Fig. 11 is a view looking in the direction of arrow 11 of Fig. 10;

Fig. 12 is a view looking in the direction of arrow 12 of Fig. 13;

Fig. 13 is a sectional view substantially on the plane of line 13—13 of Fig. 10, or looking in the direction of arrow 13 of Fig. 12; and Fig. 14 is a detail view of the scanners.

The reel stand is shown at A, the scanners at B, the slitting mechanism at C and the winder at D. A web of flexible material W passes from web roll R over a non-rotatable member 20 adjacent the scanners and over various rollers to slitting mechanism C and thence to the winding mechanism where the slitted sections are wound into rolls 21 and 22, the number of which will vary with the number of slitted sections produced. The means to support web roll R comprises essentially a shaft or chucks 23 to engage the core of the roll, which chucks are supported in bearings 24 in which they are both rotatable and slidable. One of the chucks 23 is connected by coupling 25 to a slidable member 26 which, in this instance, is a brake mechanism to control the speed of rotation of roll R. Member 26 is mounted in guides 27 and carries an internally threaded bushing 28 with which engages a threaded rod 29, the latter capable of rotation but not of endwise movement. Ma indicates a reversible motor, here of the direct current type, and 30 indicates transmission means between motor Ma and threaded rod 29. It will be understood that the means just described constitutes a mechanism for shifting the roll support or reel transversely of the direction of the flow of web W from roll R and that, when motor Ma is energized, the supply reel will be moved transversely, its direction of movement depending upon the direction of rotation of the motor. The roll stand equipment above outlined is not claimed herein but forms the subject matter of a separate application Ser. No. 37,494, filed August 23, 1935.

Slitting mechanism C may be of any suitable type such as power-driven, overlapping shears or, as here shown, they may be of the score-cut type that engage with a smooth-faced roller, here conveniently one of winding drums D, and are rotated by frictional engagement therewith.

So likewise the winding means may be of the center-wind type in which power is applied to the center of rolls 21 and 22 or, as here shown, surface winding drums D may be utilized. These drums are here driven in the same direction by a motor Mb through suitable transmission means 31. It will be understood that the winder acts as a web pulling machine to unwind the web from roll R.

Slitting and winding machines are now being operated at very high speeds, as much as a flow of a thousand feet, and over, of web per minute, and the control of a web at such a speed is no mean task. It will be understood that due to imperfections in the web and in the feeding thereof, it is difficult to maintain proper side-register of the web with respect to the slitting and winding means, and that therefore extremely sensitive and rapid-action means must be employed to maintain such side-register. The above difficulties are increased when the web to be slitted carries a printed design, for the slitting action must then take place in definite relation to such printed design, and it therefore becomes not only desirable but practically necessary to feed the web in a substantially undeviating path with respect to the slitters.

In order to overcome these difficulties, web W is supplied with a longitudinal marking M of a shade or color contrasting with that of the web, so as to modify the reflecting qualities or the translucency of that portion of the web carrying the marking. The marking may consist of one or more lines, and may be continuous or interrupted. Scanners B are so arranged here as to scan the side edges of the line, and the light sources can be arranged either to transmit light to the photo-electric cells through the material, or to impinge on the material in such a way as to reflect the light to the photo-electric cells as will be apparent. The action of the scanners is then utilized to control the energization of motor Ma, and thus the direction of movement of the reel shifting mechanism, to thereby maintain marking M in a definite path with respect to the slitters. The circuit means to accomplish this may take many forms. In Fig. 4 are shown two electric or electron discharge devices E and Ea which take the familiar form of three-element electron tubes, the grid-filament circuits 32 of which are connected to the photo-electric cells of scanners B. F and Fa indicate two circuit breakers controlled by the plate circuits 33 of devices E and Ea. Circuit breaker F controls a circuit through one winding 34 of motor Ma, and circuit breaker Fa controls a circuit through the other winding 35 of said motor. When marking M remains in its predetermined path, the armatures or circuit breakers F and Fa are in their open position and motor Ma remains deenergized; but, if marking M shifts, then one or the other of the armatures of F and Fa will move into closed position and will energize motor Ma either through winding 34 or 35 and will cause said motor to rotate in a direction appropriate to operate the reel shift mechanism through the mechanical connections previously described so as to bring marking M back to its proper path, after which motor Ma is again deenergized.

It will be understood that, if the speed of the winder which pulls the web is high, the shifting speed of the reel should be correspondingly high, and that if the winder runs slowly said shifting speed should be correspondingly slow. In Fig. 5 is shown a system in which the speed of motors Ma and Mb can be coordinated. The arrangement of the parts is the same as in Fig. 4, except that a speed control element, here conveniently represented by rheostat 36, is interposed in the circuit of motor Ma, and another speed control element, here represented by rheostat 37, is interposed in the circuit of winding motor Mb. The two rheostats are connected so that when the speed of the winding motor is changed, the speed of the reel shift motor is likewise changed.

In Fig. 6 is shown a modification of the system shown in Fig. 5, in which rheostat 36 is controlled by a speed governor 38 driven by winding motor Mb.

To guard against overrunning by reel shift motor Ma, a suitable brake mechanism can be used. A system of this character is shown in Figs. 7 and 8 which show an arrangement like that of Fig. 4, but in addition there is employed a third scanner Ba so disposed as to scan marking M instead of the edges thereof. Scanner Ba controls a three-element electron tube Eb through its grid-filament circuit 39, and plate circuit 40 of said electron tube controls a circuit breaker Fb which latter in turn controls a circuit 41 through solenoid brake G of shaft of motor Ma. So long as marking M remains in its true path, solenoid brake G acts on and holds the shaft of motor Ma from rotating but, if the marking shifts, brake G is released. When marking M shifts back to the true position, the brake is again applied.

It is not necessary to use a reversible motor to actuate the reel shift mechanism. In Fig. 9, Mc indicates a unidirectional motor which can be continuously running and drives a shaft 42. Two trains of connections extend from shaft 42 to another shaft 43, one 44 driving said shaft 43 in one direction and another 45, having an intermediate gear, driving shaft 43 in the opposite direction. Each of the transmission connections 44 and 45 includes a magnetic clutch 46 and 47. Circuit breakers F and Fa, instead of controlling the motor circuit, control the two magnetic clutches by means of a circuit 48, so that when marking M runs true both clutches are disengaged but when the marking deviates from its true path one or the other of the clutches is engaged and shaft 43 is driven in the appropriate direction. Shaft 43 carries a worm 49 engaging a sector 50 pivoted at 51, and sector 50 is provided with an arm 52 bifurcated at its upper end to engage a collar 53 on roll support 23 so as to shift the web roll in the appropriate direction. One of the advantages of this construction is that the same motor Mc can also be used to operate the winder, so that the winding and reel shaft operations are properly coordinated.

Web W after leaving roll R passes over element 20. If there be a tendency on the part of the web to buckle on element 20 due to the shifting movement of roll R, then means can be employed to shift member 20 in harmony with roll R, but to a less extent. Suitable means for accomplishing this can be obtained by mounting a sprocket 54 on the end of threaded rod 29 of the reel shift mechanism and running a sprocket chain 55 to a sprocket 56 on a threaded rod 57 capable of rotation but incapable of endwise movement. Threaded rod 57 engages an internally threaded bushing 58 carried by member 20, and said member is slidably mounted in its bearings 59.

As previously pointed out, scanners B are located adjacent to member 20. Preferably these scanners, each of which consists of a light source 60 and a photo-electric cell 61, are carried by a bracket 62 transversely adjustable on guide 63 so that both scanners are adjustable transversely in unison. Bracket 62 carries guides 64 and 65, each scanner being slidably mounted by means of slides 66 and 67 and independently adjustable transversely by means of screws 68 and 69. Slides 66 and 67 carry supplemental slides 70 and 71 by means of which the scanners can be independently adjusted toward and away from member 20 by rotating screws 72 and 73.

I claim:

1. In a control system: means to supply a web of flexible material; a reversible motor and connections to shift the web supply means transversely of the flow of the web in one direction or the other; a scanning device and circuit means, responsive to transverse displacement in the position of a mark on the web that flows from the supply means, to energize the motor in one direction or the other depending upon the direction in which said mark is displaced; and means to vary the speed of the reversible motor in response to variations in speed of the web flow.

2. In a control system: means to supply a web of flexible material; mechanism to shift the web supply means transversely of the flow of the web in one direction or the other; and means to coordinate the speed of movement of the shift mechanism with the speed of the web flow.

3. In a control system: means to supply a web of flexible material; mechanism to shift the web supply means transversely of the flow of the web in one direction or the other; and means to vary the speed of movement of the shift mechanism in response to variations in speed of the web flow.

4. In a control system: means to supply a web of flexible material; a processing mechanism to act on the web; a reversible motor and connections to shift the web supply means transversely of the flow of the web in one direction or the other; a scanning device and circuit means, responsive to transverse displacement in the position of a mark on the web that flows from the supply means to the processing mechanism, to energize the motor in one direction or the other depending upon the direction in which said mark is displaced; means to drive the processing mechanism; and means to vary the speed of the reversible motor in response to variations in speed of the drive means of the processing mechanism.

5. In a control system: means to supply a web of flexible material; a processing mechanism to act on the web; mechanism to shift the web supply means transversely of the flow of the web in one direction or the other; means to drive the processing mechanism; and means to coordinate the speed of movement of the shift mechanism with the speed of the drive means of the processing mechanism.

6. In a control system: means to supply a web of flexible material; a processing mechanism to act on the web; mechanism to shift the web supply means transversely of the flow of the web in one direction or the other; means to drive the processing mechanism; and means to vary the speed of movement of the shift mechanism in response to variations in speed of the drive means of the processing mechanism.

7. In a control system: means to supply a web of flexible material; a processing mechanism to act on the web; a device to shift the web supply means transversely of the flow of the web in one direction or the other; a motor to drive the processing mechanism and to actuate the shift device; and selective means between the motor and the shift device, controlled by the web, to actuate said shift device in one direction or the other.

8. In a control system: means to supply a web of flexible material; a processing mechanism to act on the web; mechanism to shift the web supply means transversely of the flow of the web in one direction or the other; means to prevent a movement of the shift mechanism; and means controlled by the web to actuate the shift mechanism and to nullify the action of the means to prevent movement of the shift mechanism.

9. In a control system: means to supply a web of flexible material; a processing mechanism to act on the web; mechanism to shift the web supply means transversely of the flow of the web in one direction or the other; a brake to prevent movement of the shift mechanism; and means controlled by the web to actuate the shift mechanism and to release the brake.

10. Means for controlling a flowing web of flexible material having a longitudinal mark including: three scanning devices, two of which are normally disposed one on either side of said mark and the third of which is normally in the plane of the mark, and circuit means responsive to the scanning devices.

11. Means for controlling a flowing web of flexible material including: means to supply a web of flexible material; a member over which the web passes from said supply means; mechanism to shift the web supply means transversely; and means to shift said member transversely but to a less extent than the web supply means.

ROBERT McC. JOHNSTONE.